United States Patent [19]

Sitabkhan et al.

[11] Patent Number: 4,638,894

[45] Date of Patent: Jan. 27, 1987

[54] CALIPER DISC BRAKE ASSEMBLY

[75] Inventors: Mansur N. Sitabkhan, North Royalton; Raymond E. Mack, Rocky River, both of Ohio

[73] Assignee: Eaton Corporation, Cleveland, Ohio

[21] Appl. No.: 739,343

[22] Filed: May 30, 1985

[51] Int. Cl.⁴ .......................................... F16D 65/24
[52] U.S. Cl. .................................................. 188/170
[58] Field of Search .............. 188/170, 725, 72.4, 188/82.1, 83, 369, 370, 71.9, 134; 254/379

[56] References Cited

U.S. PATENT DOCUMENTS

| | | | |
|---|---|---|---|
| 2,809,723 | 10/1957 | Howze | 188/170 |
| 3,547,233 | 12/1970 | Girvan | 188/170 |
| 3,599,761 | 8/1971 | Schultz et al. | 188/170 |
| 3,613,839 | 10/1971 | MacDuff | 188/170 |
| 3,944,027 | 3/1976 | Yamamoto | 88/71.9 |
| 4,144,953 | 3/1979 | Johnson et al. | 188/134 |

FOREIGN PATENT DOCUMENTS 2521506  8/1983  France ........................... 188/170

Primary Examiner—Duane A. Reger
Assistant Examiner—Lawrence J. Goffney, Jr.
Attorney, Agent, or Firm—D. A. Rowe; C. J. Toddy

[57] ABSTRACT

A disc brake unit for machinery, hoists and the like having a pair of brake shoes normally spring biased to a brake engaged condition. A hydraulically operated first piston may be hydraulically actuated to relieve the spring bias to release the spring pressure acting on the disc and thus release the brake. A second piston may then be actuated for moving the brake shoes against the disc and applying a modulated force to the disc while the fist piston is in position to oppose the spring bias, to thereby apply slip braking torque to the output shaft.

13 Claims, 2 Drawing Figures

CALIPER DISC BRAKE ASSEMBLY

This invention relates generally to caliper disc brakes for heavy machinery, hoists, winches, and lifting equipment. Lifting machinery such as hoists, winches and the like require power-applied brakes for modulating braking and spring-set brakes for emergency stopping in the event of power failure. In certain types of slip/hold applications for brakes, such as anchor hoists for off-shore drilling platforms, it is necessary to control slipping torque during payout of the hoist chain or cable, but apply a very high static holding torque on the chain or cable when statically loaded.

It is an object of this invention to provide an improved caliper disc brake, particularly adapted for hoists and winches and the like, which provides a very high holding torque, as well as a very smooth uniform slipping torque during the slip cycle, for example, in lowering an anchor into position on the ocean floor from a drilling platform.

Another object of the invention is to provide, in a unitary structure, a caliper disc brake having high static torque and a smooth uniform modulated slipping torque designed in the calipers of a caliper disc brake.

Although the invention may take several physical forms, alternate embodiments of the invention will be described in detail and illustrated in the accompanying drawing.

Figure 1:
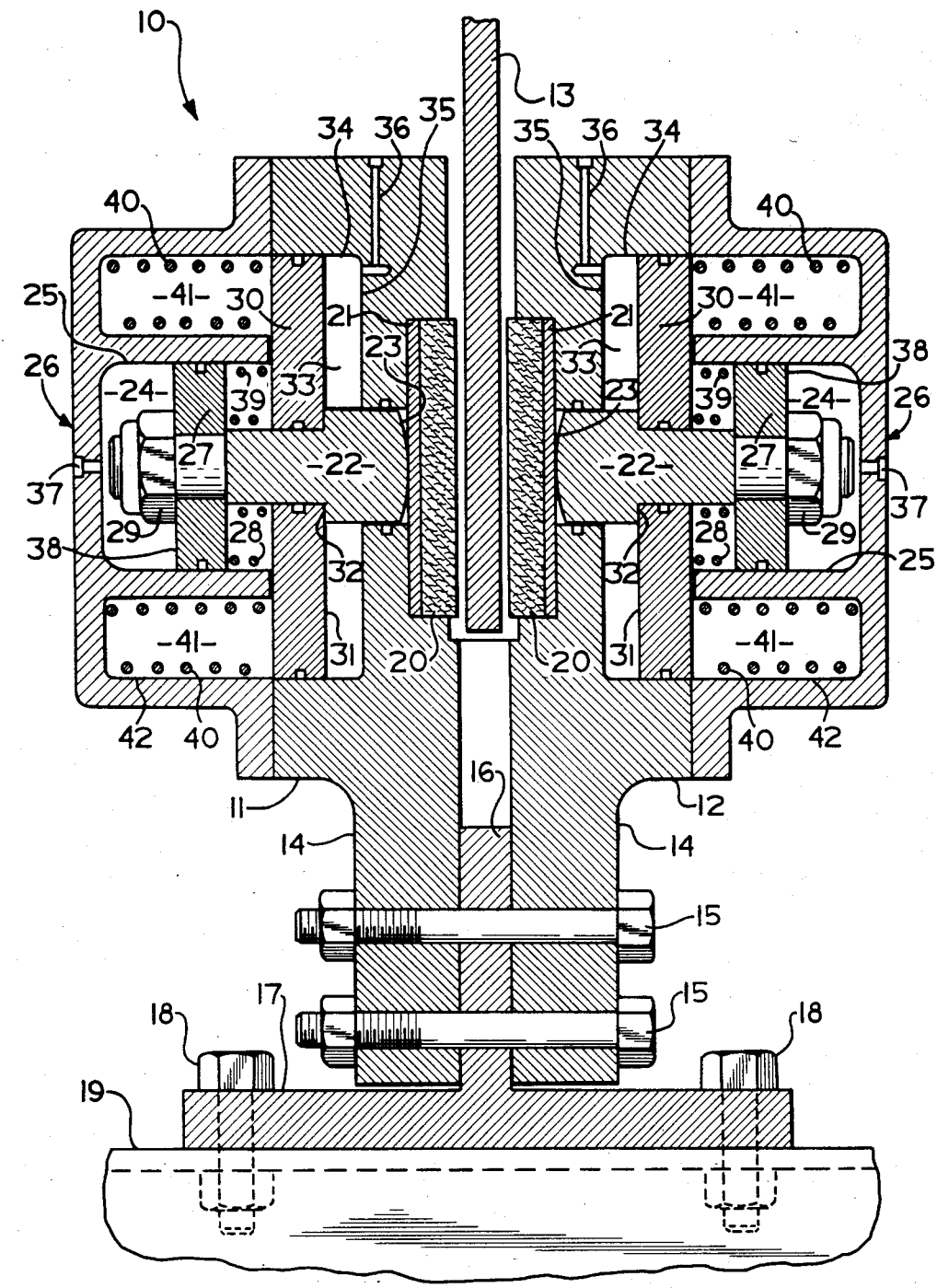
FIG. 1 is a cross-sectional view through the caliper of one emboidment of the caliper disc brake of this invention.

Referring to FIG. 1 of the drawings, a caliper disc brake actuator 10 includes housing assemblies 11 and 12 positioned on opposite sides of a rotatable disc 13. The disc 13 is splined or otherwise connected to a drive shaft (not shown) for industrial machinery such as a hoist or winch or other lifting equipment, for example, in hoisting an anchor chain for off-shore drilling platforms.

Each of the caliper housing assemblies 11 and 12 have a flange 14 connected by suitable bolts 15 to the flange 16 of an anchor member 17 which in turn is secured by bolts 18 to a fixed structure 19 adjacent to the hoists so that the caliper housing sections 11 and 12 are secured in fixed relationship an equal distance from the adjacent face of the disc 13. Alternatively, the flanges 14 of each assembly may be made as a unitary structure such as is illustrated in U.S. Pat. No. 3,547,233 issued to Girvan and U.S. Pat. No. 3,613,839 issued to MacDuff. In such a structure, the member 17 may be mounted to the fixed structure 19 by a "floating" connection to permit limited movement of the flange 14 in a direction parallel to the axis of rotation of the disc 13.

Since each of the housing assemblies 11 and 12 are of like construction, the corresponding elements of the housing assemblies will hereinafter be identified by the same numerals.

Brake pads or friction elements 20 are bonded to a backing plate 21 and mounted in a recess formed in each housing assembly. Each pad 20 is adapted to frictionally engage the adjacent face of the disc 13 when the brake is actuated.

A force transmitting member or rod 22 is operably disposed in each housing assembly 11 and 12 and are axially aligned with each other and with the centerline of each of the brake pads 20. The rods 22 have a rounded end 23 contacting each of the backing plates 21. The rods 22 extend into cylindrical cavities 24 formed by the cylindrical walls 25 and the end cap 26, which is suitably bolted or otherwise secured to the housings.

A first piston member 27 is mounted on one end of each rod and secured against the rod shoulder 28 by means of a nut 29. A second piston 30 of larger diameter than piston 27 is mounted for limited slidable movement on each of the rods 22 at a location intermediate the ends of the rods 22. The face 31 of piston 30 bears against a radially extending surface or shoulder 32 formed on the rods 22. The second pistons 30 are positioned in cavities 33 formed in the housings by the cylindrical walls 34 and end wall 35.

Inlet 36 communicates with the cylindrical cavity 33 so that fluid pressure can be introduced and act against the face 32 of the second piston 30.

An inlet 37 communicates with the cylindrical cavity 24 so that fluid pressure can be introduced into cylinder 24 and act against the face 38 of the first piston 27.

A low compression spring 39 is positioned between the first and second pistons 27 and 30 which functions to bias the rod 22 in a direction away from the brake pad 20 when pressure is applied to cavity 33 and relieved from cavity 24.

A compression spring means 40, in the form of a plurality of Belleville springs or helical wound compression springs, are contained within a cavity 41 formed by the cylindrical wall 42. The cavity 41 is located radially outward of the cavity 24, is concentric with the cavity 24 and is of approximately equal in length to the cavity 24. The spring means 40 engage the radially outer end of the piston 30 and actuate the brake pads 20 whenever pressure is relieved from the cylindrical cavity 33 by forcing the second piston 30 against the rod abutment or shoulder 32 and thereby force the ends 23 of the rods 22 and the pads 20 into engagement with disc 13.

Figure 2:
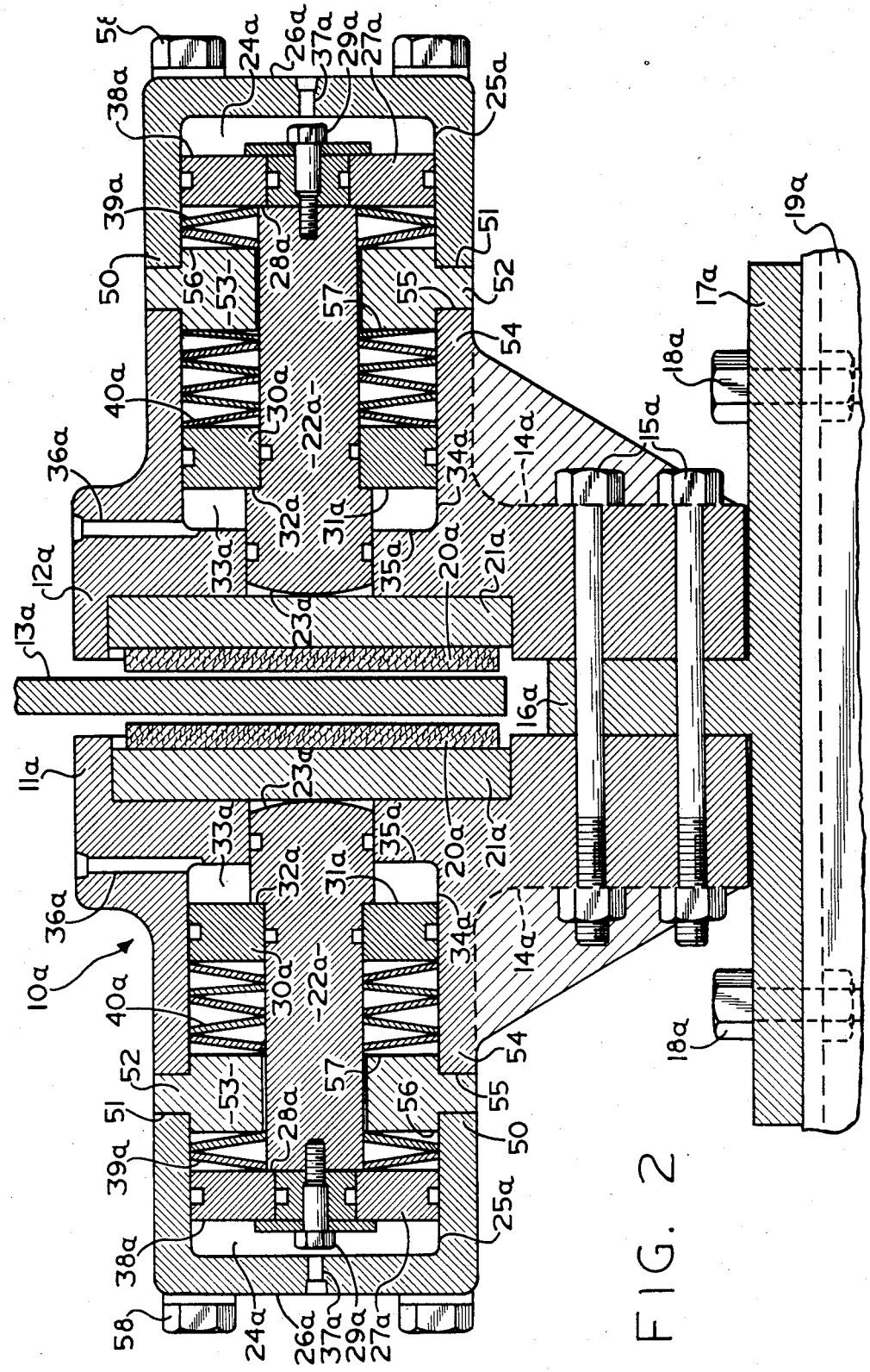
FIG. 2 is a cross-sectional view through the caliper of another embodiment of the caliper disc brake of this invention.

Referring to FIG. 2 the brake actuator 10a includes housing assemblies 11a and 12a position on opposite sides of the rotatably disk 13a. Each of the housing assemblies has a flange 14a connected by suitable bolts 15a to the flange 16a of an anchor member 17a which in turn is secured by bolts 18a to a fixed structure 19a adjacent the brake acutator. Brakes pads or friction elements 20a are bonded to a backing plate 21a which are mounted in a recess formed in each housing assembly 11a and 12a.

A force transmitting member or rod 22a is operably disposed in each housing. The rods 22a are axially aligned with each other and with the centerline of each of the brake pads 20a. The rods 22a extend into cylinder cavities 24a formed by the cylindrical walls 25a and the end cap 26a which is suitably bolted or otherwise secured to the housings. A first piston member 27a is mounted on one end of each rod and secured against the shoulder 28a by bolts 29a. A second piston 30a of equal diameter to the piston 27a is mounted for limited slidable movement on each of the rods 22a at a location intermediate to the ends of the rods 22a. The face 31a of piston 30a bears against a radially extending surface or shoulder 32a formed on the rods 22a. The second pistons 30a are positioned in cavities 33a formed in the housing by the cylindrical walls 34a and an end wall 35a.

An inlet 36a communicates with each cylindrical cavity 33a so that fluid pressure can be introduced and act against the face 31a of each second piston 30a.

An inlet 37a communicates with each cylindrical cavity 24a so that fluid pressure can be introduced into cylinder 24a and act against the face of 38a of each first piston 27a.

In the embodiment shown in FIG. 2, the end cap 26a is cup shaped and has a circular end 50 which bears against a side 51 of the flange 52 formed on the ring 53. The cylindrical portion 54 of the housing 11a and 12a bears against the side 55 of the flange 52. Ring 53 has a wall 56 facing the piston 27a and a second wall 57 facing the piston 30a. The end cap 26a, and the ring 53 are secured to the portion 54 of each housing by suitable bolts 58.

A plurality of Belleville washers or spring means 40a are positioned between the ring 53 and the piston 30a and normally bias the piston 30a against the shoulder 32a of the force transmitting rod 22a. A set of Belleville washers or spring means 39a are positioned between the ring 53 and the piston 27a to bias the rod 22a in a direction away from the brake pad 20a when pressure is applied to a cavity 33a and relieved from cavity 24a.

Referring to FIGS. 1 and 2, a high static braking torque is normally applied to the disc 13 or 13a by the spring means 40 or 40a, as described above. In order to release the static braking torque, fluid pressure is introduced via inlet 36 or 36a into the cylindrical cavities 33 or 33a to force the pistons 30 or 30a against the spring means 40 or 40a, to compress the spring means so that braking pressure is relieved from the brake pads. With fluid pressure applied to the second piston 30 or 30a, the bias force of springs 39 or 39a forces the rod 22 or 22a in a direction away from the brake pads 20 and 20a. Fluid may then be introduced into the cylindrical cavity 24 or 24a, via inlet 37 or 37a, against piston 27 or 27a at a modulated and controlled pressure, so that corresponding modulated and controlled braking force is applied to the brake pads 20 or 20a to thereby apply a modulated braking torque to the disc 13 or 13a.

From the foregoing, it is apparent that the present invention provides a caliper disc braking system for many industrial applications requiring a very high brake holding torque to hold a static load and a very smooth uniform slipping torque in a unitary structure. Thus, the disc braking system of the present invention may be applied to lifting machinery to provide a high holding torque on a statically loaded hoist cable and a smooth uniform slipping torque during payout of the hoist cable.

We claim:

1. A caliper disc brake having a rotor disc and a pair of friction means disposed on opposite sides of the rotor disc comprising;
   a pair of housing members supporting said friction means including means for mounting said friction means adjacent to and on opposing sides of said rotor disc, a bore in at least one of said housing members;
   a force transmitting member slidably mounted in said bore, having means at one end which coacts with said friction members to move same into contact with the rotor disc;
   a first piston slidable in said bore and fixed to the force transmitting member at the end thereof opposite to said one end;
   a first spring means normally biasing said first piston and the force transmitting member in a direction away from said friction members element;
   a second piston disposed in said bore and slidably mounted on and intermediate the ends of said force transmitting member, an abutment means formed on said force transmitting member adjacent said second piston;
   a second spring means normally biasing said second piston in a direction toward the friction members element and having a biasing force substantially greater than said first spring means to force said second piston against said abutment means to apply the brake;
   means to apply fluid pressure to said second piston on the side opposite said second resilient means to compress said second spring means and release the brake, and;
   means to apply a modulated fluid pressure to said first piston on the side thereof opposite to said first spring means to thereby cause said force transmitting member to apply a modulated braking force to said friction members elements.

2. A caliper disc brake as claimed in claim 1 in which said second piston is located between said abutment means and said second spring means.

3. A caliper disc brake as claimed in claim 2 in which said second piston is of larger diameter than said first piston.

4. A caliper disc brake as claimed in claim 3 in which said second spring means is located radially outward of said first piston and coaxially with the radially outer portion of said second piston.

5. A caliper disc brake as claimed in claim 4 in which second spring means is located in a cavity formed in said housing and located radially outwardly of said first piston.

6. A caliper disc brake as claimed in claim 5 in which said cavity extends axially coextensive with said first piston.

7. A caliper disc brake as claimed in claim 1 in which said first spring means is positioned in said bore between said first and second pistons and coaxially with said pistons to bias said pistons in a direction away from each other.

8. A caliper disc brake as claimed in claim 1 in which said housing includes a segment extending radially inwardly into said bore between said first and second spring means, said first and second spring means bearing against said segment.

9. A caliper disk brake as claimed in claim 8 in which said first spring means is locate between first piston and said segment and said second spring means is located between said second piston and said segment.

10. A caliper disc brake as claimed in claim 9 in which said first and second pistons operate in portions of said bore which are of the same diameter.

11. A caliper disc brake as claimed in claim 9 in which said spring means and pistons are of the same diameter.

12. A caliper disc brake as claimed in claim 8 in which said housing includes an end wall and a cylindrical cavity in the end of the housing opposite to said one end of said force transmitting member, said first piston being positioned adjacent said end wall and said first spring means extending coaxially with said first piston in said cylindrical cavity.

13. A caliper disc brake as claimed in claim 8 in which said second spring means and second piston are located in said cylindrical cavity between said housing segment and said one end.

* * * * *